(12) United States Patent
Bütikofer et al.

(10) Patent No.: US 10,625,383 B2
(45) Date of Patent: Apr. 21, 2020

(54) MOUNTING DEVICE FOR MACHINE TOOLS AND MACHINE TOOL WITH A MOUNTING DEVICE

(71) Applicant: Bystronic Laser AG, Niederönz (CH)

(72) Inventors: Hannes Bütikofer, Rohrbach (CH); Alois Theiler, Oensingen (CH)

(73) Assignee: BYSTRONIC LASER AG, Niederonz (CH)

( * ) Notice: Subject to any disclaimer, the term of this patent is extended or adjusted under 35 U.S.C. 154(b) by 126 days.

(21) Appl. No.: 15/853,185

(22) Filed: Dec. 22, 2017

(65) Prior Publication Data

US 2019/0176279 A1   Jun. 13, 2019

(30) Foreign Application Priority Data

Dec. 11, 2017  (DE) .................... 20 2017 107 536 U

(51) Int. Cl.
| | | |
|---|---|---|
| *H01F 7/20* | (2006.01) | |
| *B23Q 3/154* | (2006.01) | |
| *B23Q 1/00* | (2006.01) | |
| *B23Q 1/34* | (2006.01) | |
| *B21D 43/28* | (2006.01) | |

(52) U.S. Cl.
CPC ......... *B23Q 3/1543* (2013.01); *B23Q 1/0054* (2013.01); *B23Q 1/34* (2013.01); *B21D 43/287* (2013.01)

(58) Field of Classification Search
CPC ... H01F 7/02; H01F 7/06; H01F 7/064; H01F 7/0273; H01F 7/00; H01F 7/20; G03B 27/58; G03B 27/62

USPC .......................................................... 335/289
See application file for complete search history.

(56) References Cited

U.S. PATENT DOCUMENTS

| | | | | | |
|---|---|---|---|---|---|
| 249,388 | A | * | 11/1881 | Muller ...................... | B03C 1/02 |
| | | | | | 209/230 |
| 564,296 | A | * | 7/1896 | Walker ................. | B23Q 3/1543 |
| | | | | | 335/289 |
| 651,908 | A | * | 6/1900 | Walker ................. | B23Q 3/1543 |
| | | | | | 269/8 |
| 691,828 | A | * | 1/1902 | Walker ................. | B23Q 3/1543 |
| | | | | | 147/5 |
| 798,668 | A | * | 9/1905 | Fox .......................... | G09F 13/00 |
| | | | | | 335/289 |
| 1,003,900 | A | * | 9/1911 | Hanson ................ | B23Q 3/1543 |
| | | | | | 269/8 |

(Continued)

FOREIGN PATENT DOCUMENTS

| | | |
|---|---|---|
| CN | 205552078 U | 9/2016 |
| JP | H0947930 A | 2/1997 |

*Primary Examiner* — Shawki S Ismail
*Assistant Examiner* — Lisa N Homza
(74) *Attorney, Agent, or Firm* — Workman Nydegger

(57) ABSTRACT

A mounting device for mounting a machine tool to a floor area is provided. The mounting device includes mounting units that are attachable to the machine tool. Counter-mounting units are disposed on the floor area. The mounting device may also include electromagnets that are disposed on either the mounting units or the counter-mounting units. The machine tool can be mounted or removed by switching the electromagnets on and off. When one of the mounting units or the counter-mounting units includes the electromagnets, the other may include a ferromagnetic material.

16 Claims, 5 Drawing Sheets

(56) References Cited

U.S. PATENT DOCUMENTS

Figure 1:
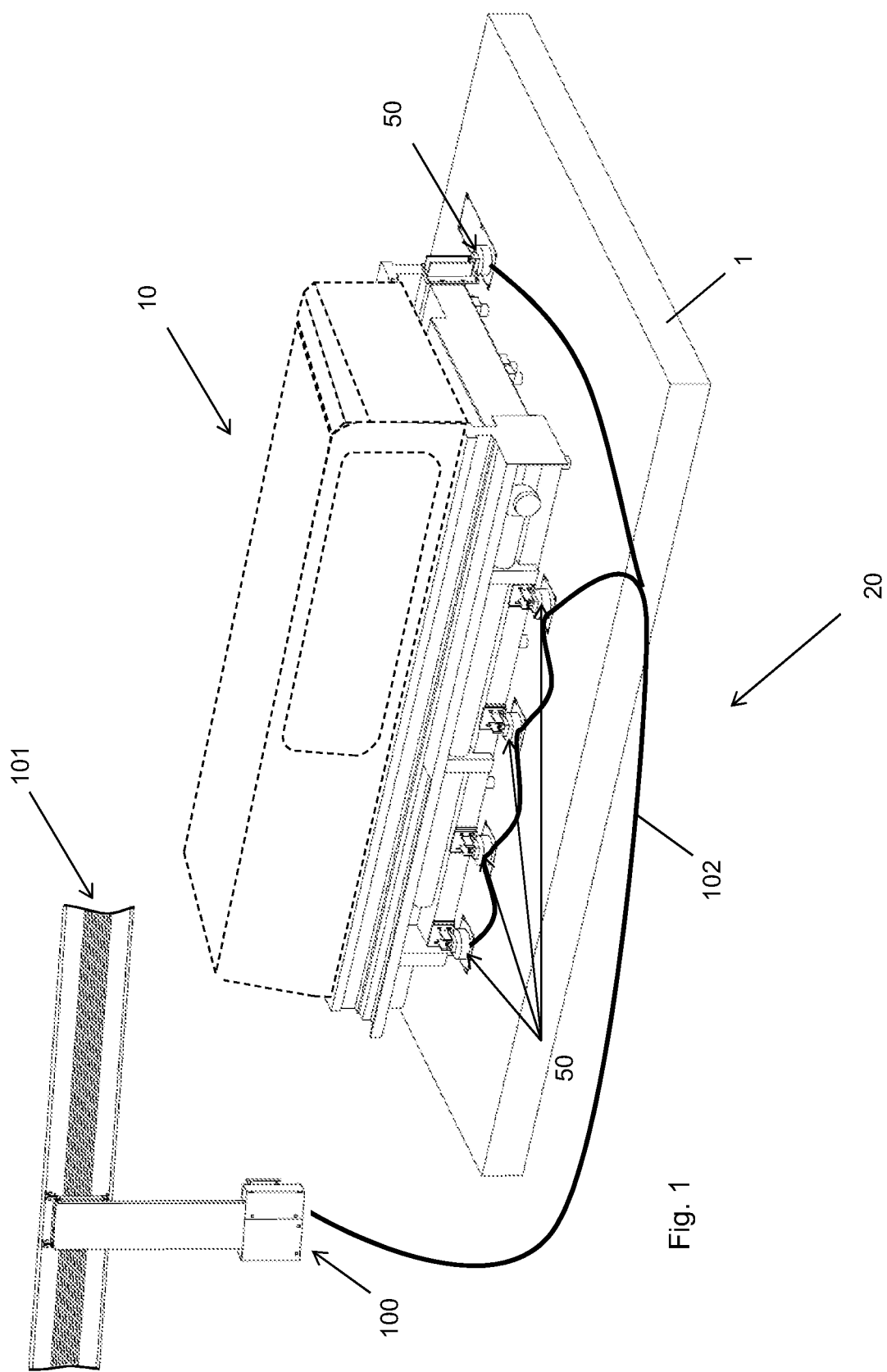

| | | | | |
|---|---|---|---|---|
| 1,013,574 A * | 1/1912 | Walker | B23Q 3/1543 | 192/84.1 |
| 1,079,546 A * | 11/1913 | Downes et al. | B23Q 3/1543 | 192/84.1 |
| 1,081,462 A * | 12/1913 | Patton | B23Q 3/1543 | 192/84.1 |
| 1,125,198 A * | 1/1915 | Spencer | B23Q 3/1543 | 269/8 |
| 1,146,867 A * | 7/1915 | Griffith | B23Q 3/1543 | 269/8 |
| 1,180,457 A * | 4/1916 | Walker | B23Q 3/1543 | 269/8 |
| 1,182,636 A * | 5/1916 | Burns | G09B 23/181 | 335/224 |
| 1,199,947 A * | 10/1916 | Walker et al. | B23Q 3/1543 | 269/8 |
| 1,212,555 A * | 1/1917 | Pragst | B23Q 3/1543 | 269/8 |
| 1,232,512 A * | 7/1917 | Downes et al. | B23Q 3/1543 | 269/8 |
| 1,232,532 A * | 7/1917 | Griffith | B23Q 3/1543 | 269/8 |
| 1,254,736 A * | 1/1918 | Simmons | B23Q 3/1543 | 335/289 |
| 1,290,868 A * | 1/1919 | Arter | B23Q 3/1543 | 335/286 |
| 1,317,786 A * | 10/1919 | Hartshorn | B23Q 3/1543 | 335/289 |
| 1,329,733 A * | 2/1920 | Walker | B23Q 3/152 | 335/286 |
| 1,339,553 A * | 5/1920 | Dunbar | B23Q 3/1543 | 335/286 |
| 1,349,343 A * | 8/1920 | Moran | B23Q 3/1543 | 335/286 |
| 1,360,054 A * | 11/1920 | Sweet | B23Q 3/1543 | 335/289 |
| 1,412,776 A * | 4/1922 | Coradi | B23Q 3/1543 | 335/289 |
| 1,414,522 A * | 5/1922 | Morgan | B23Q 3/1543 | 164/109 |
| 1,415,723 A * | 5/1922 | Simmons | B23Q 3/1543 | 335/286 |
| 1,435,946 A * | 11/1922 | Simmons | B23Q 3/1543 | 335/289 |
| 1,442,545 A * | 1/1923 | Walker | B23Q 3/1543 | 335/286 |
| RE15,884 E * | 8/1924 | Coradi et al. | B23Q 3/1543 | 335/289 |
| 1,507,777 A * | 9/1924 | Karasick | B23Q 3/1543 | 164/109 |
| 1,528,796 A * | 3/1925 | Simmons | B23Q 3/1543 | 335/288 |
| 1,537,633 A * | 5/1925 | Walker | B23Q 3/1543 | 335/289 |
| 1,555,877 A * | 10/1925 | Ripberger | B23B 31/28 | 335/288 |
| 1,568,024 A * | 12/1925 | Spencer | B23Q 3/1543 | 335/288 |
| 1,569,599 A * | 1/1926 | Zehnder | B23Q 3/1543 | 335/289 |
| 1,608,677 A * | 11/1926 | Sederholm | B23Q 3/1543 | 164/DIG. 9 |
| 1,636,533 A * | 7/1927 | Sears, Jr. et al. | B23Q 3/1543 | 335/289 |
| 1,647,951 A * | 11/1927 | Bing | B23Q 3/1543 | 335/289 |
| 1,667,766 A * | 5/1928 | Bing | B23Q 3/1543 | 335/286 |
| 1,744,768 A * | 1/1930 | Humphreys | B23Q 3/1543 | 101/382.1 |
| 1,853,471 A * | 4/1932 | Storch | B23Q 3/1543 | 335/286 |
| 1,970,922 A * | 8/1934 | Simmons | B23Q 3/1543 | 29/607 |
| 1,995,522 A * | 3/1935 | Shurley | B23Q 3/1543 | 101/126 |
| 2,086,164 A * | 7/1937 | Karasick | B23Q 3/1543 | 335/289 |
| 2,104,472 A * | 1/1938 | St Clair | B23Q 3/1543 | 269/8 |
| 2,132,885 A * | 10/1938 | Tracy | B23Q 3/1543 | 335/287 |
| 2,458,138 A * | 1/1949 | Blanchard, Jr. | F21V 21/0965 | 335/289 |
| 2,561,769 A * | 7/1951 | Anderson | B23Q 3/1543 | 279/128 |
| 2,561,770 A * | 7/1951 | Anderson | B23Q 3/1543 | 248/206.5 |
| 2,678,991 A * | 5/1954 | Amfitheatrof | H05B 3/685 | 126/211 |
| 2,773,303 A * | 12/1956 | Tirone | H01F 7/06 | 269/152 |
| 2,787,874 A * | 4/1957 | Blood | B23B 31/28 | 192/84.2 |
| 3,146,381 A * | 8/1964 | Moreau | H01F 7/08 | 292/251.5 |
| 3,389,357 A * | 6/1968 | Schneider | B23Q 3/1546 | 335/289 |
| 3,401,365 A * | 9/1968 | Grader | B66C 7/00 | 335/289 |
| 3,533,652 A * | 10/1970 | Crane | E05C 17/56 | 292/251.5 |
| 3,824,516 A * | 7/1974 | Benowitz | B03C 1/253 | 198/619 |
| 3,829,805 A * | 8/1974 | Spodig | F16F 15/03 | 335/289 |
| 4,075,589 A * | 2/1978 | Braillon | B23Q 3/1546 | 335/286 |
| 4,090,162 A * | 5/1978 | Cardone | B23Q 3/1546 | 335/289 |
| 4,111,027 A * | 9/1978 | Bottomley | B21D 5/042 | 72/320 |
| 4,237,439 A * | 12/1980 | Nemoto | G03B 17/38 | 335/179 |
| 4,691,183 A * | 9/1987 | Vernikov | B23Q 3/1543 | 335/289 |
| 4,777,463 A * | 10/1988 | Cory | B23Q 3/1546 | 335/286 |
| 4,847,582 A * | 7/1989 | Cardone | B23Q 3/1546 | 335/289 |
| 4,956,625 A * | 9/1990 | Cardone | B23Q 3/1546 | 335/290 |
| 5,138,293 A * | 8/1992 | Ishimaru | F16D 27/112 | 192/84.94 |
| 5,243,314 A * | 9/1993 | Maruyama | B23Q 3/1546 | 269/8 |
| 5,320,206 A * | 6/1994 | Maejima | F16D 27/112 | 192/84.961 |
| 5,428,331 A * | 6/1995 | Graner | B23Q 3/1546 | 118/500 |
| 6,002,317 A * | 12/1999 | Pignataro | B23Q 3/1543 | 335/285 |
| 6,104,270 A * | 8/2000 | Elias | B66C 1/04 | 335/289 |
| 6,229,422 B1 * | 5/2001 | Pignataro | H01F 7/206 | 335/285 |
| 6,278,350 B1 * | 8/2001 | Dorner | B23K 37/0408 | 335/289 |
| 6,489,871 B1 * | 12/2002 | Barton | B25B 11/002 | 335/285 |
| 7,212,277 B2 * | 5/2007 | Miyajima | G03F 7/707 | 269/8 |
| 7,782,164 B2 * | 8/2010 | Tiberghien | B25B 11/002 | 335/285 |
| 8,031,038 B2 * | 10/2011 | Kimura | B29C 45/1742 | 335/285 |
| 8,210,585 B2 * | 7/2012 | Molteni | B66C 1/06 | 294/65.5 |

(56) References Cited

U.S. PATENT DOCUMENTS

| | | | | |
|---|---|---|---|---|
| 8,292,276 B2* | 10/2012 | Cardone | ............... | B25B 11/002 269/8 |
| 8,832,940 B2* | 9/2014 | Sarh | ............... | B21J 15/14 269/8 |
| 8,970,334 B2* | 3/2015 | Choi | ............... | H01F 7/04 335/285 |
| 10,236,107 B2* | 3/2019 | Choi | ............... | H01F 7/0273 |
| 2004/0212471 A1* | 10/2004 | Day | ............... | B25B 11/002 335/285 |
| 2005/0088785 A1* | 4/2005 | Chang | ............... | H02K 3/26 360/317 |
| 2006/0232367 A1* | 10/2006 | Shen | ............... | B23Q 3/1546 335/289 |
| 2008/0315055 A1* | 12/2008 | Feng | ............... | B25J 15/0608 248/309.4 |
| 2009/0184789 A1* | 7/2009 | Lee | ............... | B23Q 3/1546 335/289 |
| 2011/0037547 A1* | 2/2011 | Cardone | ............... | B23Q 3/1543 335/290 |
| 2011/0043310 A1* | 2/2011 | Cardone | ............... | B23Q 3/1546 335/289 |
| 2011/0304418 A1* | 12/2011 | Schuessler | ............... | G03F 7/707 335/289 |
| 2012/0210802 A1* | 8/2012 | Sarh | ............... | B21J 15/10 73/862.625 |
| 2013/0263431 A1* | 10/2013 | Sarh | ............... | B21J 15/14 295/525.01 |
| 2014/0321073 A1* | 10/2014 | Hong | ............... | G06F 1/1652 361/749 |
| 2015/0116062 A1* | 4/2015 | Natti | ............... | B23Q 3/1543 335/286 |
| 2015/0279536 A1* | 10/2015 | Ding | ............... | H01F 7/0252 335/289 |
| 2016/0069656 A1* | 3/2016 | Cook | ............... | G01B 5/14 33/549 |
| 2018/0255948 A1* | 9/2018 | Fritz | ............... | B29C 69/00 |

* cited by examiner

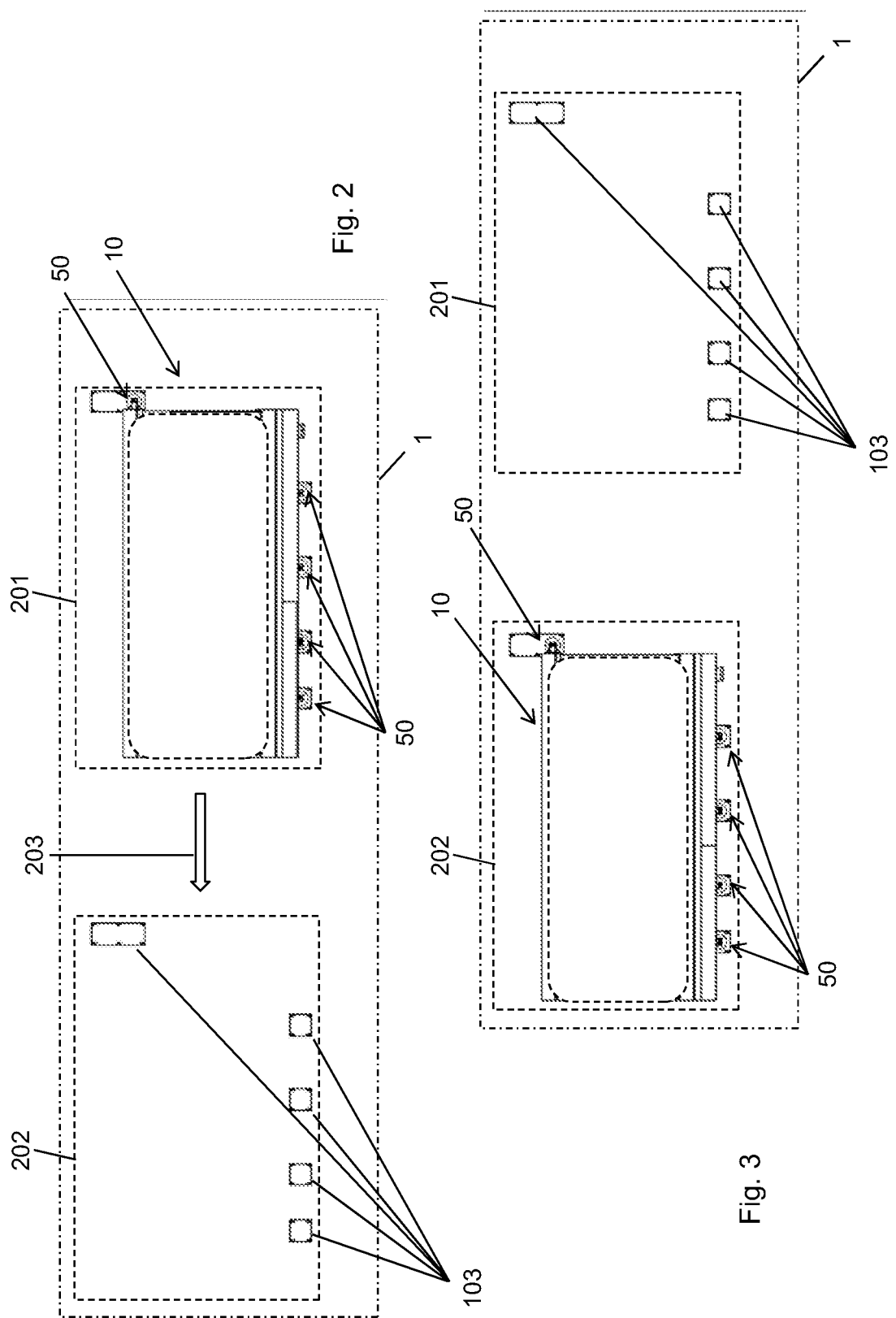

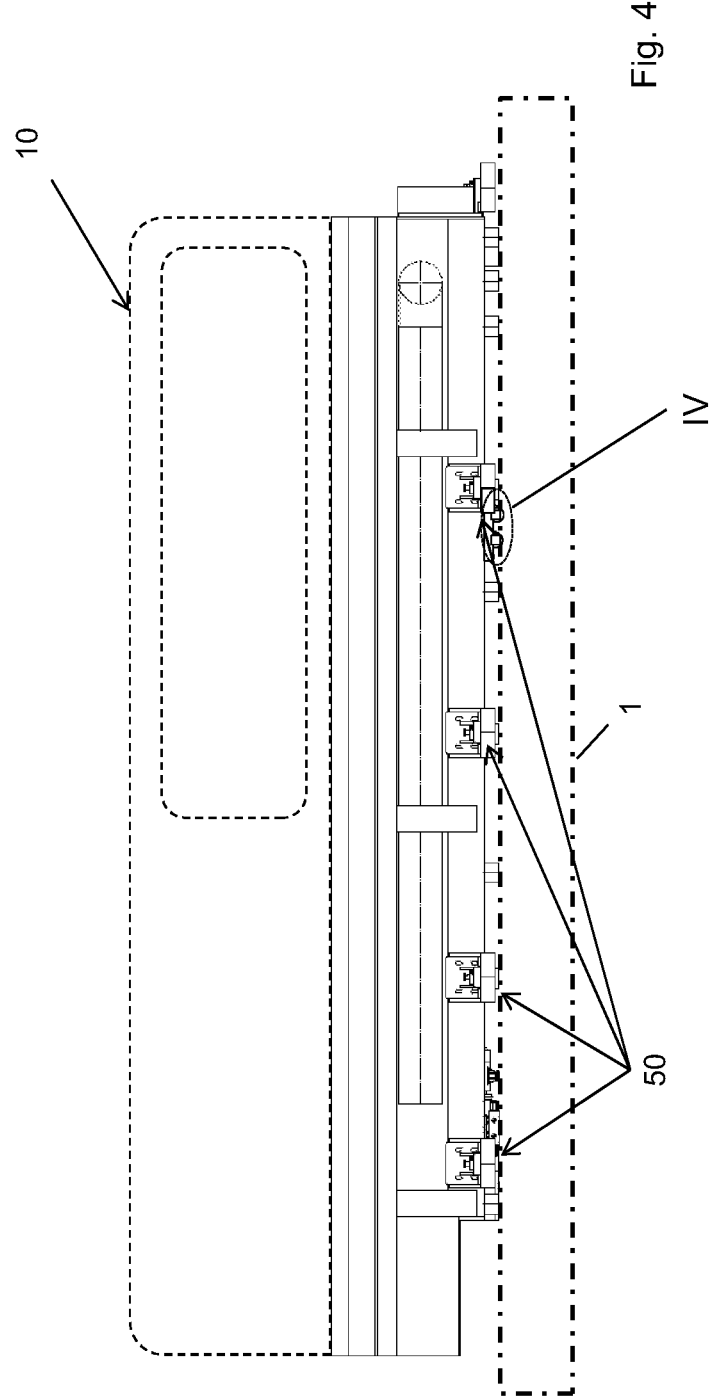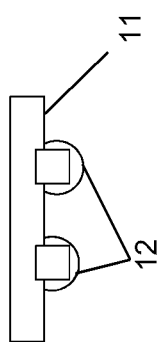

MOUNTING DEVICE FOR MACHINE TOOLS AND MACHINE TOOL WITH A MOUNTING DEVICE

The invention relates to a mounting device for machine tools and a machine tool with a mounting device. In particular, the invention relates to a releasable mounting of a machine tool by means of electromagnets.

The machine tools are, for example, sheet metal processing machines—in particular, laser-cutting, bending, or water-jet cutting machines. These types of machine tools are usually very heavy and have relatively large dimensions. Thus, these machine tools can cover an area of approx. one to several square meters.

In a cycled production of such machine tools, it is necessary for the machine tool to be repeatedly raised, moved, lowered, affixed to the ground or floor, and released again. A traditional mounting with heavy-duty dowels, ground anchors, or screw fittings is associated with considerable labor time for fixing and releasing. When a production or machining line is modified, the machine tools must be adjusted too. With small production runs or in rapid prototyping, this can occur more frequently, meaning that a traditional mounting in these areas makes considerable demands on labor time. Moreover, such machine tools that are used for the production of goods in production halls often have to be moved from one site to another—for example, to adapt a production process to a new or modified product.

CN 205552078 U discloses a receiving device for a milling machine for receiving miniature components. The receiving device has a trough-shaped support and mounting brackets disposed above it for a cylindrical work piece. The mounting brackets are fixed by means of pins, which in turn are fixed by means of electromagnets. Only work pieces are fixed in this case, and operation is still cumbersome, since mounting brackets and pins are still required.

JP H0947930 A discloses a clamping device for attaching a mobile machine tool to a work piece. In so doing, a combination of an electromagnet and a clamping lever device is used. In this case as well, a connection is introduced between the work piece and the machine tool, which also requires a complex operation using a clamping lever.

The aim underlying the invention, then, is to avoid the disadvantages of the prior art and to provide an improved mounting device.

This aim is achieved by a mounting device according to claim 1 and a machine tool according to claim 11.

The mounting device according to the invention for mounting a machine tool on a floor area comprises a plurality of mounting units that can be attached to the machine tool, a plurality of counter-mounting units that are disposed on the floor area, electromagnets that are disposed on either mounting units or counter-mounting units, wherein the respective opposed mounting unit or counter-mounting unit has ferromagnetic material, and a control device set up for switching the electromagnets on and off. In so doing, the mounting units may be fixed reversibly on the counter-mounting units by means of the electromagnets.

Ferromagnetic materials are, for example, ferrimagnetizable materials, e.g., ferrite, or ferromagnetizable materials, e.g., metals, e.g., iron, cobalt, nickel, or steel. In other words, the invention considers ferromagnetic materials to be materials with magnetic permeability ($\mu_r$) of approx. 300 up to 300,000.

The mounting device according to the invention has the advantage that a floor fixing or mounting is provided which quickly and easily—namely, by activating or deactivating the electromagnets—attaches the machine tool or releases it again. Therefore, bolting or placing ground anchors is no longer necessary every time the machine tool is moved. It is only necessary to provide the counter-mounting units once. The electromagnets can be disposed in either the mounting units or the counter-mounting units. It is also possible that one part of the electromagnets be disposed in the mounting units, and the other part in the counter-mounting units. Ferromagnetic material serves as a counterpole to the electromagnets and is disposed accordingly in the mounting unit or counter-mounting unit respectively opposed to an electromagnet. Therefore, an electromagnet and ferromagnetic material are provided in each mounting unit and counter-mounting unit pair to produce the magnetic attraction.

Provision may be made for a plurality of mounting units to be disposed along one fixing side of the machine tool and for a mounting unit to be disposed on one corner of a releasing side of the machine tool. The mounting concept suggested here also supports machine tools with a releasing side which may expand and/or move. The one mounting unit disposed angularly gives the machine tool a degree of rotatory freedom.

Provision may also be made for the mounting units to each have a leveling device—in particular, a hydraulic clamping bush. If the floor area—for instance, a hall floor—is not completely level, the leveling devices may compensate for this. At least one leveling device is provided. Similarly, leveling devices are provided on all or on some mounting units.

Advantageously, provision may be made for the electromagnets to be disposed on the mounting units and for the counter-mounting units to be designed as anchor elements—in particular, anchor plates. A design of this type as magnetizable anchor plates made from metal, e.g., iron or steel, facilitates simple assembly.

In a favorable further development, the counter-mounting units are designed as metal plates—preferably, metal plates made from unalloyed tool steel, e.g., from a Ck45 steel. Thus, on the one hand, a good magnetic force is achieved, and, on the other, a high mechanical load capacity, as well as simple production and assembly, are ensured.

Provision may also be made for the counter-mounting units to be disposed in a grid. The counter-mounting units may have a square base area, the dimensions of which correspond to those of the supporting surface of the electromagnets. The grid orients itself to the layout of the machine tools. Provision may be made for a modular system for different machine tools, which facilitates the use of the grid by machine tools of different sizes. Metal rails may also be used instead of individual metal plates, said rails facilitating a continuous installation in the direction of their longitudinal extension, in contrast to the intermittent or discrete installation in the case of the counter-mounting units. The counter-mounting units are preferably recessed to floor level.

Provision may also be made for the counter-mounting units to have a greater extension for the releasing side. This offers scalability for further machine tools, e.g., a next generation, in one direction. An expansion of the machine tool in the area of the releasing side is also facilitated.

Provision may also be made for an AC/DC converter to be provided for supplying the electromagnets. One challenge posed by the application of the electromagnets is the ability to control the magnets electrically, and to demagnetize them after their use. The remanence (residual magnetism) prevents the electromagnets from being released immediately after their deactivation. On an assembly line, it is important to be able to move the machines from one cycle to another without long waiting times. So that the remanence may be kept to a minimum, a converter (AC to DC) utilized for this purpose is in use.

Provision may be made for the AC/DC converter to provide a higher voltage for activating the electromagnets and a lower voltage for releasing the electromagnets. Supplying the electromagnets with only DC voltage allows simple supply and control.

Provision may be made for the AC/DC converter to provide a higher voltage of 220 volts and a lower voltage of 15 volts. It has been shown that, with a voltage of 15, the electromagnets do not attract again, and the remanence is eliminated as quickly as possible.

The machine tool according to the invention comprises a mounting device as described above. The same advantages and modifications apply as described above.

Provision may be made for extendable rollers for moving the machine tool to be provided on a base of the machine tool. Thus, the machine tool, in combination with the electromagnets, may be released, moved, and mounted again very easily.

Provision may also be made for the machine tool to be a sheet metal processing machine—in particular, a laser-cutting, bending, or water-jet cutting machine. In particular, large machine tools, such as those for sheet metal processing, may be securely mounted using the electromagnets, and quickly and easily released again. This is advantageous for cycled production and when adjusting a machining line.

Further preferred embodiments of the invention ensue from the remaining features specified in the dependent claims.

The various embodiments of the invention mentioned in this application may be advantageously combined with one another, unless otherwise executed in individual cases.

Figure 6A:
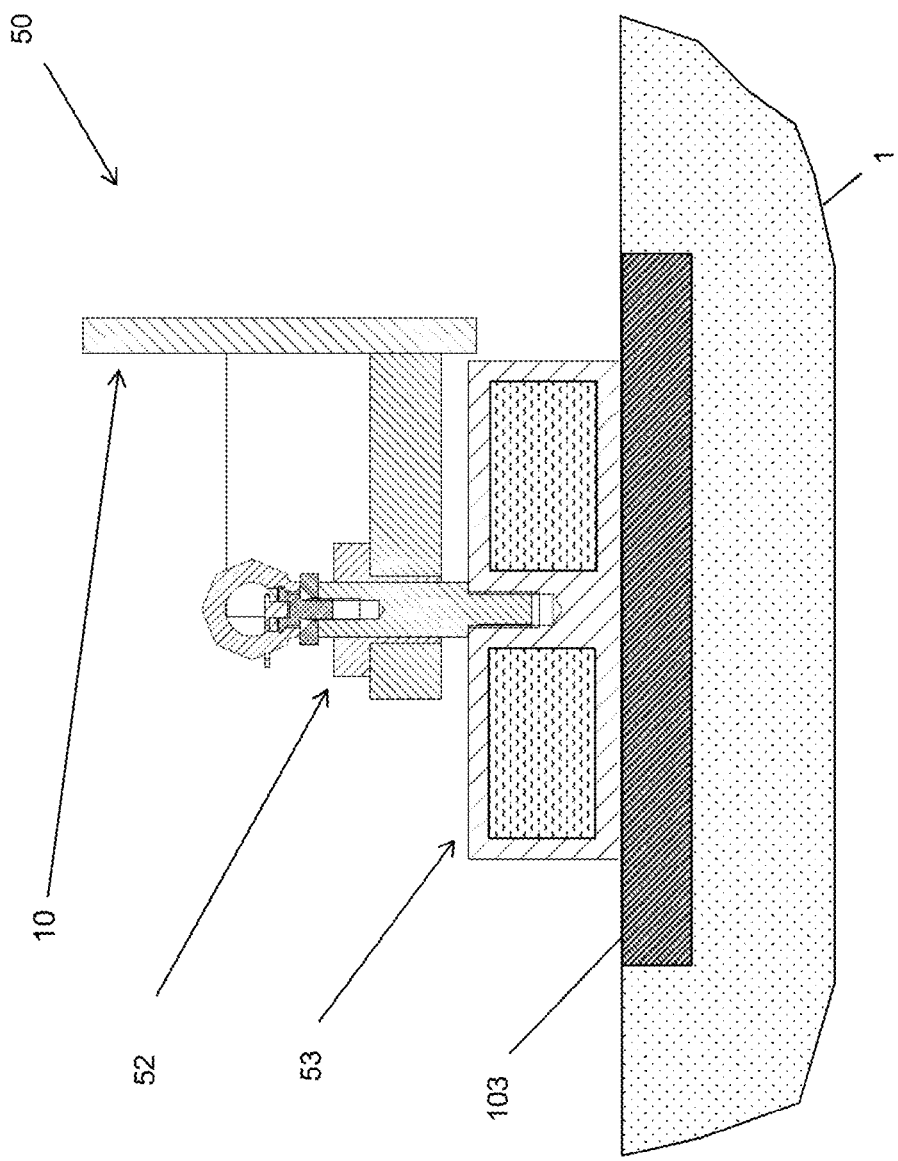

The invention is explained below in exemplary embodiments with the aid of the relevant drawings. The figures show:

FIG. 1 a schematic perspective view of a machine tool with mounting device;

FIG. 2 a plan view of a cycled production of a machine tool on a first station;

FIG. 3 a plan view of a cycled production of a machine tool on a second station;

FIG. 4 a side view of the machine tool on a station;

FIG. 5 a schematic view of a lifting/moving console;

FIG. 6*a* a mounting unit with electromagnet in an activated state, and

Figure 6B:
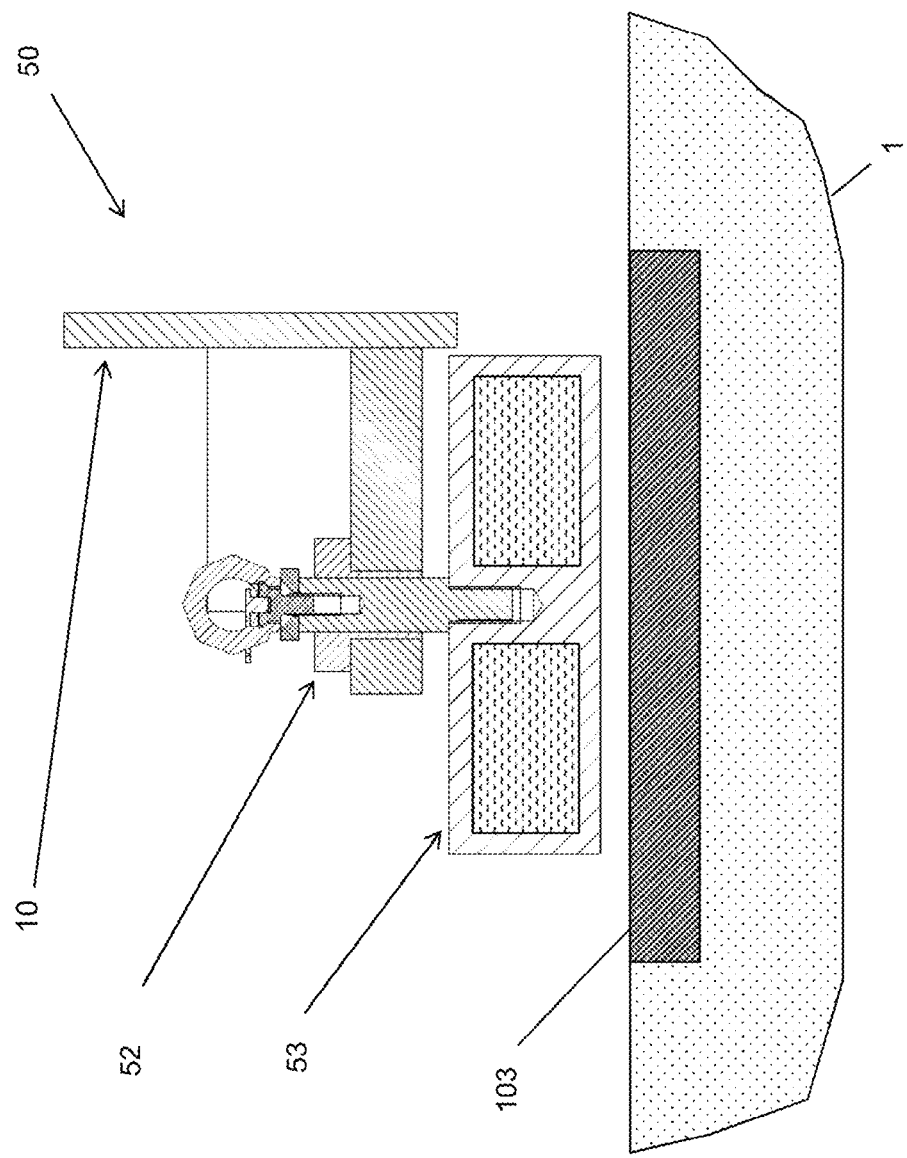

FIG. 6*b* a mounting unit with electromagnet in a deactivated state.

FIG. 1 shows a schematic perspective view of a machine tool 10 with a mounting device 20, which permits an easy and, in particular, quick mounting of the machine tool 10 on a floor area 1. The floor area 1 may be a hall floor of a production or assembly hall, or assembly sites of a cycled assembly line.

The machine tool 10 may, for example, be a sheet metal processing machine—in particular, a laser-cutting, bending, or water-jet cutting machine. It is also possible for the machine tool 10 to be a bending press, folding press, or laminated glass press, a milling center or a complete machining center, or a machine for rapid prototyping, such as, for example, a laser sintering machine. These types of machine tools are usually very heavy and have relatively large dimensions. Thus, these machine tools can have an area of approx. one to several square meters.

This mounting device 20 may be defined at least in part as an integral component of the machine tool 10. In this case, the machine tool 10 could already be produced with integrated mounting device 20. On the other hand, the mounting device 20 may be defined as an element that is external to the machine tool 10. In this case, the mounting device 20 may, for example, be provided as a retrofit kit for the machine tool 10.

The mounting device 20 comprises a plurality of mounting units 50 which are mountable or mounted on the machine tool 10. In this example, each of the mounting units 50 has one or more electromagnets. The function of the electromagnets is described subsequently with the aid of the further figures. The mounting units 50 serve to fix the machine tool 10 to the floor area 1. The machine tool 10 further comprises machine feet, by means of which the machine tool 10 stands on the floor area 1.

The mounting device 20 further comprises a control device 100, which is supplied with energy and/or data by means of a conductor rail 101 or conductor lines. The control device 100 controls the operation of the electromagnets and the reduction in the remanence of the electromagnets. The control device 100 further allows the operation of a lifting unit, and provides the necessary energy for the mounting device 20 and, optionally, for the machine tool 10. To this end, the control device 100 is connected by means of a line 102 to the mounting device 20—more precisely, to the mounting units 50.

FIGS. 2 and 3 show the machine tool 10 in a cycled production. In FIG. 2, the machine tool 10 is located on a first station or assembly site 201. The cycle direction or direction of production 203 runs in the direction of a second assembly site 202 on which the machine tool 10 is located, as shown in FIG. 3. Therefore, FIG. 2 is a view of a first cycle, and FIG. 3 a view of a subsequent second cycle.

Each assembly site 201 and 202 has a plurality of counter-mounting units designed as ferromagnetic or magnetizable anchor plates 103—in particular, metal or steel plates—said units being disposed on the floor area 1. It is particularly favorable for the anchor plates to be formed from an unalloyed tool steel—in particular, from a Ck45 steel. The counter-mounting units 103 or the anchor plates act as counterpart to the electromagnets of the mounting units 50. Preferably, the counter-mounting units 103 designed here as anchor plates are recessed into the floor area 1, so that a level surface results. The anchor plates 103 of the mounting device 20 are disposed in a grid size that corresponds to a grid of the mounting units 50 mounted on the machine tool 10.

The machine tool 10 has a fixing side and a releasing side, whereby an expansion of the machine tool 10 is facilitated. The expansion of the machine tool 10 may be caused by the operation of said machine tool or by temperature fluctuations. Four mounting units 50, and therefore four counter-mounting units 103 or anchor plates, are disposed on the fixing side. These four mounting units 50 are disposed along one edge on the fixing side of the machine tool 10. These four mounting units 50 are disposed equidistantly. In order to facilitate an expansion of the machine tool 10, only one mounting unit 50 is disposed on the releasing side. This one mounting unit 50 is disposed on a corner of the releasing side. Therefore, this one mounting unit 50 acts like a rotary bearing for the releasing side.

The anchor plates 103 on the fixing side have a square outline, the dimensions of which essentially correspond to the outline of the mounting units 50. The anchor plate 103 on the releasing side has a rectangular outline, with the same width as the other anchor plates 103 and a greater length or extension. The length corresponds to approximately twice the length of the other anchor plates 103. Therefore, the mounting device 20 is also prepared for machines with a greater depth than the machine tool 10 shown.

It is understood that, instead of the mounting units 50, the counter-mounting units may be provided with electromagnets, and the mounting units that are disposed on the machine tool have magnetic metal parts or metal plates which may interact with the electromagnetic counter-mounting units.

The cycled production process of the machine tool 10 will now be described. FIG. 2, in accordance with which the machine tool 10 is located in a fixed state on the first assembly site 201, is used as the basis. First of all, the electromagnets of the mounting units 50 are released. The control device 100 comprises an AC/DC converter for providing DC voltages to the mounting units 50. For switching on or activating the electromagnets, the AC/DC converter provides a higher voltage of between 100 and 280 volts—for example, 220 volts or 110 volts. At this juncture, this abuts on the electromagnets and is now switched off. In a next step, the AC/DC converter provides a lower voltage of 10 to 30 volts—preferably, 15 volts. This lower voltage allows a quick reduction in the remanence of the electromagnets so that, shortly afterwards, the machine tool 10 is no longer fixed and is ready to be moved.

Lifting units with rollers for moving the machine tool 10 are then activated, so that the machine tool 10 is now supported on rollers. The machine tool 10 is then moved with the aid of the rollers to the second assembly place 202. The energy supply for the mounting device 20 is preserved without interruption, since the control device 100 is carried along on the conducting line 101.

On the second assembly site 202, the rollers are first retracted, and the electromagnets are then activated by means of the higher voltage of 220 volts. The activation of the electromagnets fixes the machine tool 10 securely to the second assembly site 202, as shown in FIG. 3. To move the machine tool 10 further, e.g., to an assembly place not shown or out of the production, the steps from the first assembly site 201 are repeated. The machine tool 10 may also be moved as described in the context of the operation of a production machine—for example, during an adjustment to a production line.

In FIG. 4, the machine tool 10 is shown in plan view. More precisely, the fixing side of the machine tool 10 is shown. The machine tool 10 is shown ready to move. This means that the electromagnets of the mounting units 50 are released, and that the rollers are lowered. In this state, both the mounting units 50 and the machine feet are raised off the floor area 1.

FIG. 5 shows details of a lifting and moving console 11 with the rollers 12. Several lifting and moving consoles 11—preferably, four—are provided for. The rollers 12 are heavy-duty rollers. The lifting and moving console 11 is controlled by the control device 100, and preferably operated hydraulically.

The mounting units 50 with the electromagnets 53 are described in more detail with the aid of FIGS. 6a and 6b.

FIG. 6a shows a mounting unit 50, which may also be described as a magnet console, in the activated position. In the activated position, the mounting unit 50 and, therewith, the connected machine tool 10 are fixed to the floor area 1 by means of the counter-mounting units or anchor plate 103 designed as a metal plate.

The mounting unit 50 is usually screwed to the machine tool 10 and thereby connected positively to the machine tool 10. The mounting unit 50 is connected non-positively to the anchor plate 103 by means of the activated electromagnets 53. A standard electromagnet with sufficient holding force may be used as electromagnet 53. The holding force for an electromagnet 53 is calculated from the overall holding force required for the machine tool 10 divided by the number of electromagnets 53.

The mounting unit 50 comprises a leveling device 52 in the form of a hydraulic clamping bush. Prior to the electromagnets 53 being activated, the clamping bush is released, so that the electromagnet 53 lies with one contact surface flat on the anchor plate 103. The clamping bush or coupling is then fixed, so that the electromagnet 53 is fixed in the contact position. The higher voltage is then applied to the electromagnet 53, whereby said electromagnet, and therewith the machine tool 10, are mounted or fixed magnetically to the anchor plate 103.

FIG. 6b shows the mounting unit 50 in the moving position. In this position, the machine tool 10 stands on the rollers 12, so that the mounting unit 50 with the electromagnet 53 is raised off the floor area 1.

The mounting device 20 or machine tool 10 presented here permits a machine tool to be magnetically fixed quickly and easily, without bolting or placing ground anchors.

The invention claimed is:

1. A mounting device for mounting a machine tool to a floor area, the mounting device comprising:
   a plurality of mounting units attachable to the machine tool;
   a plurality of counter-mounting units that are disposed on the floor area;
   electromagnets, that are disposed on either the plurality of mounting units or on the plurality of counter-mounting units, wherein the respective opposed mounting unit or counter-mounting unit includes a ferromagnetic material, and
   a control device configured to provide a higher voltage to activate the electromagnets to mount the plurality of mounting units to the plurality of counter-mounting units and a lower voltage less than the first higher to release the electromagnet and eliminate the remanence while the lower voltage is still applied to the electromagnets.

2. The mounting device according to claim 1, wherein the plurality of mounting units are disposed along one fixing side of the machine tool, and a corner mounting unit is disposed on one corner of a releasing side of the machine tool.

3. The mounting device according to claim 2, wherein the corner counter-mounting unit has a greater extension for the releasing side.

4. The mounting device according claim 1, wherein the plurality of mounting units each include a leveling device.

5. The mounting device according to claim 4, wherein the levelling device comprises a hydraulic clamping bush.

6. The mounting device according to claim 1, wherein the electromagnets are disposed on the plurality of mounting units, and the plurality of counter-mounting units cooperating with the plurality of mounting units are configured as anchor elements.

7. The mounting device according to claim 6, wherein the anchor elements comprise anchor plates.

8. The mounting device according to claim 1, wherein the plurality of counter-mounting units are configured as metal plates.

9. The mounting device according to claim 8, wherein the metal plates comprise an unalloyed tool steel or a Ck45 steel.

10. The mounting device according to claim 1, wherein the plurality of counter-mounting units are disposed in a grid.

11. The mounting device according claim 1, further comprising an AC/DC converter configured to supply current or voltage to the electromagnets.

12. The mounting device according to claim 1, wherein the higher voltage is 220 volts and the lover voltage is 15 volts.

13. A machine tool comprising a mounting device according to claim 1.

14. The machine tool according to claim 13, further comprising extendable rollers for moving the machine tool, wherein the extendable rollers are provided on a base of the machine tool.

15. The machine tool according to claim 13, wherein the machine tool comprises a sheet metal processing machine.

16. The machine tool according to claim 15, wherein the sheet metal processing machine is one of a laser cutting machine, a bending machine, or a water jet cutting machine.

* * * * *